United States Patent
Rubakha

(10) Patent No.: US 10,721,273 B2
(45) Date of Patent: Jul. 21, 2020

(54) AUTOMATED SECURITY POLICY

(71) Applicant: McAfee, LLC, Santa Clara, CA (US)

(72) Inventor: Dmitri Rubakha, Santa Clara, CA (US)

(73) Assignee: McAfee LLC, Santa Clara, CA (US)

( * ) Notice: Subject to any disclaimer, the term of this patent is extended or adjusted under 35 U.S.C. 154(b) by 68 days.

(21) Appl. No.: 15/791,840

(22) Filed: Oct. 24, 2017

(65) Prior Publication Data

US 2018/0115585 A1 Apr. 26, 2018

Related U.S. Application Data

(60) Provisional application No. 62/413,134, filed on Oct. 26, 2016.

(51) Int. Cl.
| | | |
|---|---|---|
| H04L 29/06 | (2006.01) | |
| G06F 9/455 | (2018.01) | |
| G06F 21/53 | (2013.01) | |
| G06F 8/61 | (2018.01) | |
| G06F 21/56 | (2013.01) | |

(52) U.S. Cl.
CPC ........... H04L 63/20 (2013.01); G06F 8/61 (2013.01); G06F 9/45545 (2013.01); G06F 9/45558 (2013.01); G06F 21/53 (2013.01); G06F 21/566 (2013.01); H04L 63/105 (2013.01); G06F 8/63 (2013.01); G06F 2009/45587 (2013.01); G06F 2009/45595 (2013.01)

(58) Field of Classification Search
CPC .................................. H04L 9/00; G06F 21/00
See application file for complete search history.

(56) References Cited

U.S. PATENT DOCUMENTS

| | | | |
|---|---|---|---|
| 9,158,915 B1 | 10/2015 | Yumer et al. | |
| 9,355,248 B1 | 5/2016 | Wiest et al. | |
| 10,002,247 B2* | 6/2018 | Suarez | G06F 21/31 |
| 10,313,479 B2* | 6/2019 | Lochhead | H04L 47/70 |
| 2002/0054101 A1* | 5/2002 | Beatty | G06Q 10/06 |
| | | | 715/764 |
| 2007/0240222 A1 | 10/2007 | Tuvell et al. | |
| 2011/0119729 A1 | 5/2011 | Bergeson et al. | |

OTHER PUBLICATIONS

International Search Report and Written Opinion issued for PCT/US2017/058207 dated Jan. 18, 2018; 9 pages.

* cited by examiner

Primary Examiner — Joseph P Hirl
Assistant Examiner — Leynna Truvan
(74) Attorney, Agent, or Firm — Patent Capital Group

(57) ABSTRACT

There is disclosed a computing apparatus, including: a hardware platform; a service mapping requirements table including a plurality of components and having associated therewith a plurality of service requirements; an isolation platform; and a security policy engine configured to: receive a new appliance image for the isolation platform; scan the new appliance image and build a bill of materials (BoM) for the new container image, the BoM including a plurality of components; search the service mapping requirements table for the plurality of components and identify service requirements for the components; and generate a security policy for the new appliance image.

25 Claims, 8 Drawing Sheets

AUTOMATED SECURITY POLICY

CROSS REFERENCE TO RELATED APPLICATIONS

This Application claims priority to U.S. Provisional Application 62/413,134, titled "Automated Security Policy Generation," filed Oct. 26, 2016, which is incorporated herein by reference.

FIELD OF THE SPECIFICATION

This disclosure relates in general to the field of network computing, and more particularly, though not exclusively, to a system and method for automated security policy.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
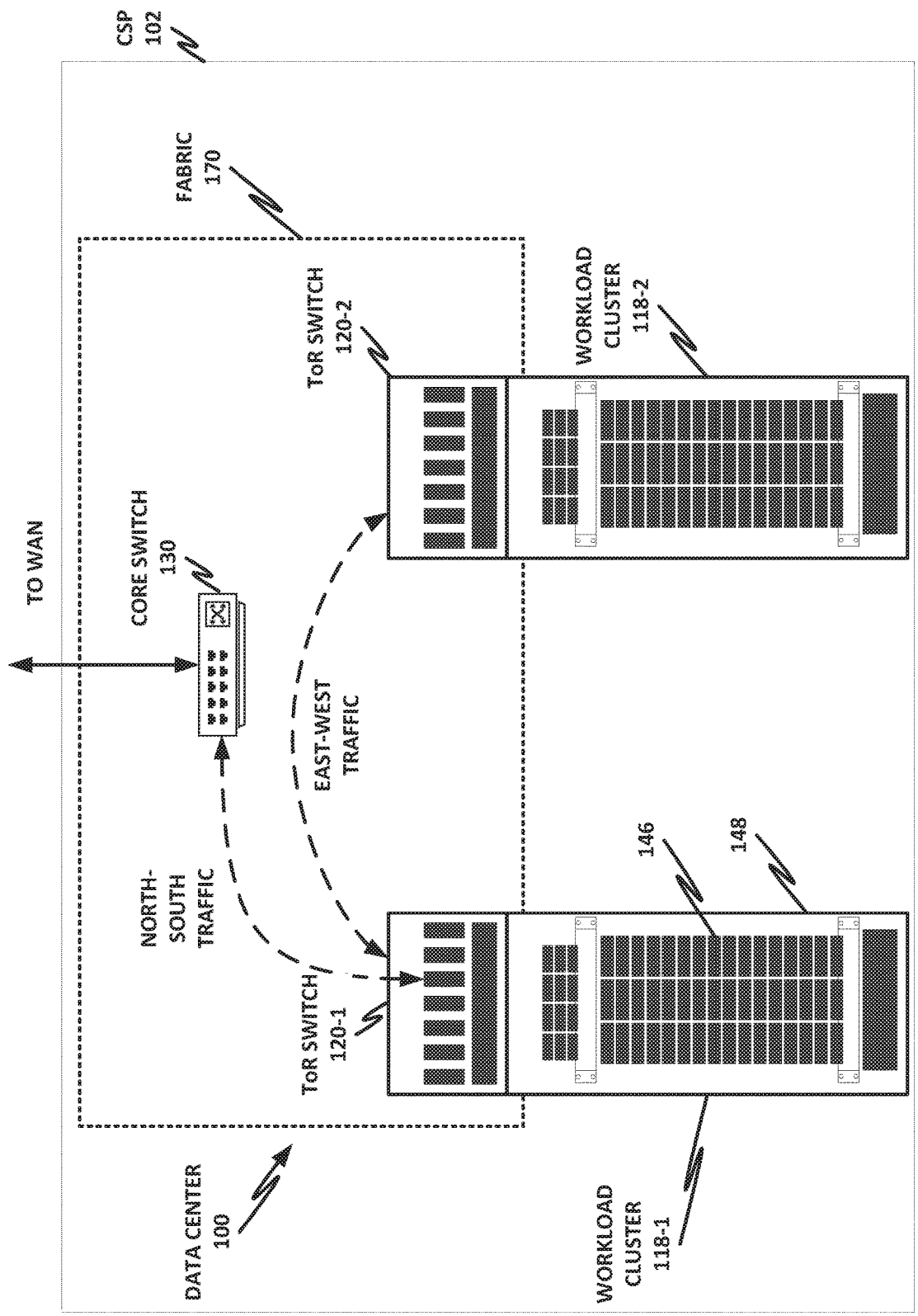
FIG. 1 is a block diagram of selected components of a data center with network connectivity, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

One challenge in a data center, such as an enterprise data center or a cloud service provider (CSP), is that a large number of different appliances may be provided in the data center and each may have its own security requirements. Thus, each different appliance may need to have its own custom crafted service chain, with a series of network functions, including, for example, policies for an intrusion prevention system (IPS) and/or an intrusion detection system (IDS). These policies may need to be crafted manually, and may need to be crafted to cover a full range of known possible combinations of application versions and operating systems to provide reliable protection. As with any complex human process, there are many opportunities for error in such an approach. An administrator may be required to create very large policies with all possible signatures, which may lead to inefficiency as the large policy sets lead to higher memory consumption and more expensive processing when matching policies against network traffic.

A contemporary computing trend is to provide workload services in containers, wherein the container is allocated by a container engine (e.g., CoreOS, Docker, Linux Containers (LXC), or similar) and the container image is loaded into the container, similar to the use of a virtual appliance image in network function virtualization. Throughout this specification, both virtualization (e.g., NFV) and containerization may be referred to generically as "isolation platforms," in the sense that both virtualization and containerization isolate a tool stack from the underlying environment and from each other.

When a container image is allocated, a detailed bill of materials (BOM) may be created listing all the layers and software components are part of the image. Because the use of these tool chains and software stacks may be relatively uniform across different deployments, and may employ binary identical pieces, the various libraries and pieces of a software stack may be hashed and compared to hashes of known components and their versions.

Embodiments of the present specification use such a matching process to compare the software stack or libraries of a new container to a list of known binary objects. Each of the known binary objects may have its own preallocated IPS or IDS. Thus, by hashing the various components of the software stack that the container uses, the hashes may be compared to known components and their preallocated IPS/IDS, and thus, an overall IPS or IDS for the container can be built based on the requirements of those known components. This creates a well-tailored IPS/IDS policy for the container, with only relevant signatures being matched to policy decisions. Furthermore, those policy decisions can be bound in a database to the software components that they are crafted for, and those software components can be bound in the database to different containers that use them. Thus, when an IPS or IDS for a particular software component is updated, those properties can be back propagated to the containers that use them. This automated process eliminates the human factor, and allows more efficient and accurate allocation of IPS and IDS policies to containers that use known binary elements.

Embodiments of the present specification generate automatic policies for network IPS that inspect or monitor containers (provided, e.g., by Docker, CoreOS, or LXE by way of nonlimiting example). IPS signatures may be built on the assumption that a particular binary object will have a property with the name and version of the specific software component, and that vulnerabilities of that software component are known and can be associated with that signature. There may also be a system or component that allows matching of binary files to specific software components, for example by matching the underlying signatures of each binary to known components and their versions. Not only can this exact binary hashing and matching be used to propagate policies, but it may also be used to verify that the software package is what it claims to be. In operation, incoming traffic to the container may then be redirected to a service chain, which may include an IPS or IDS, which inspects incoming traffic before handing it off to the relevant container.

By way of nonlimiting example, an embodiment of the present specification may provide the following use case:

a. Within the container host, a container image is added to the private registry of the container engine.

b. The container image may be scanned, and a detailed bill of materials (BOM) may be built that lists all of the layers and software components that are part of the container image created.

c. The container image may be scanned and a binary level analysis may be performed on each layer, with underlying signatures of each binary match to known components and their versions.

d. All detected components and their versions may be cross-referenced with an IPS signature database, and a set of relevant signatures may be created.

e. An IPS policy may be created and pushed to the IPS with a tag for the specific container image.

f. The container image may then be downloaded to the host and executed within the new container.

g. A host-based or container image-based security component (e.g., prototyped by ISecG OCTO) may redirect container network traffic to the IPS for inspection. This may include one or both of east-west traffic or north-south traffic according to policy. Traffic may be redirected to the IPS with a container image identification tag.

h. The IPS identifies container instance traffic and applies the relevant, auto-generated IPS policy to the traffic.

i. When a new IPS signature is added to the signature database, it may be checked for a match to any of the existing container images, and relevant IPS policies may be auto-updated.

This method automatically creates well-tailored IPS policies, according to the relevant signatures of the software components in a container. This policy may be specific to the container workload, and may provide automatic updating with new signatures when relevant. This helps to eliminate human error in the crafting of the IPS and provides for more efficient and accurate IPS protection for containerized workloads.

Note that in the previous example, a containerized workload was used as an example. However, the teachings of the present specification may also be relevant to virtualized workloads, such as in network function virtualization. Also note that the IPS or IDS may itself be provided within a container or a virtual machine as appropriate to the enterprise needs.

A system and method for automated security policy will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42 U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (A™) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
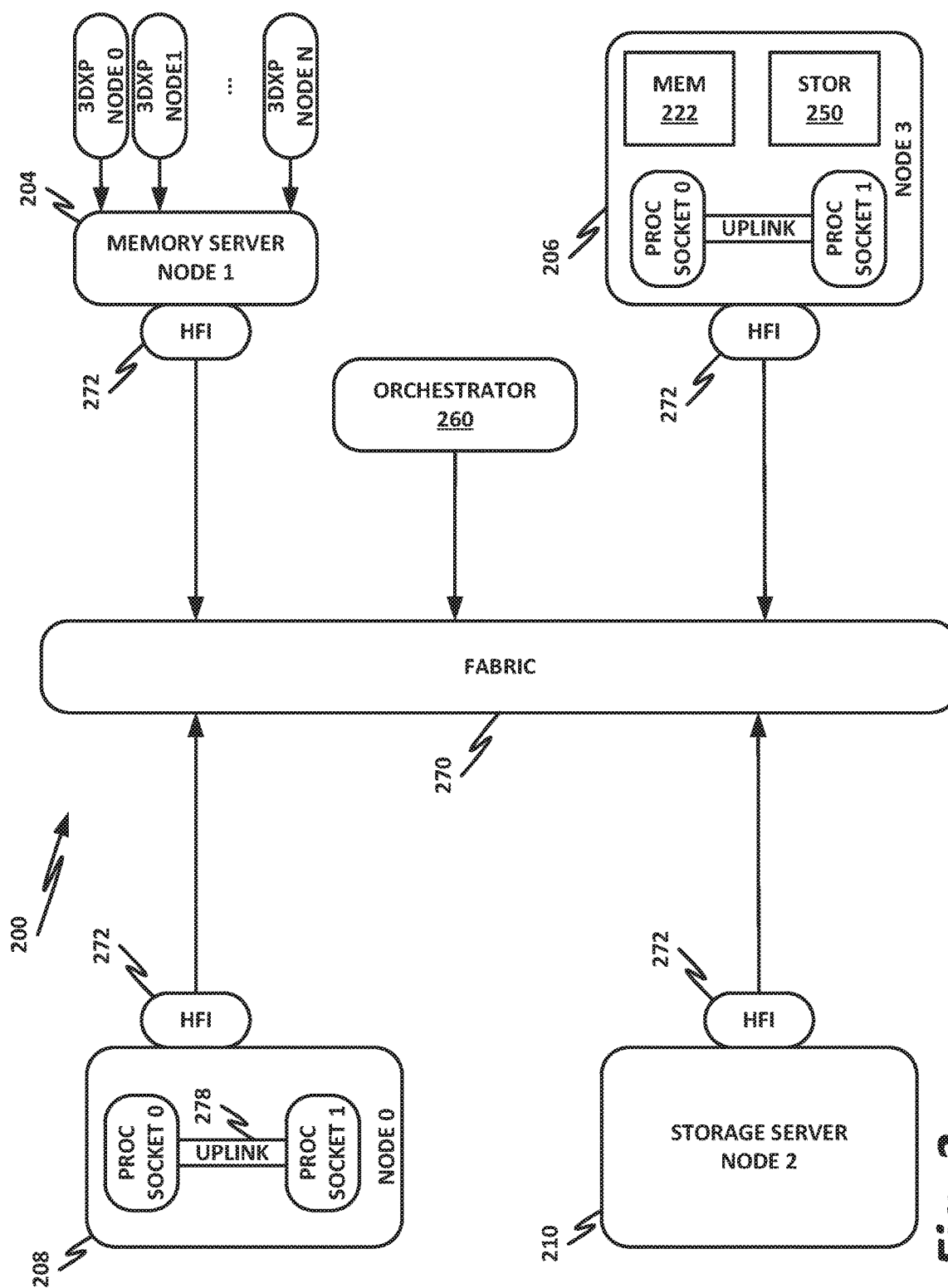
FIG. 2 is a block diagram of selected components of an end-user computing device, according to one or more examples of the present specification.

FIG. 2 is a block diagram of a data center 200, according to one or more examples of the present specification. Data center 200 may be, in various embodiments, the same as network 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes an HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
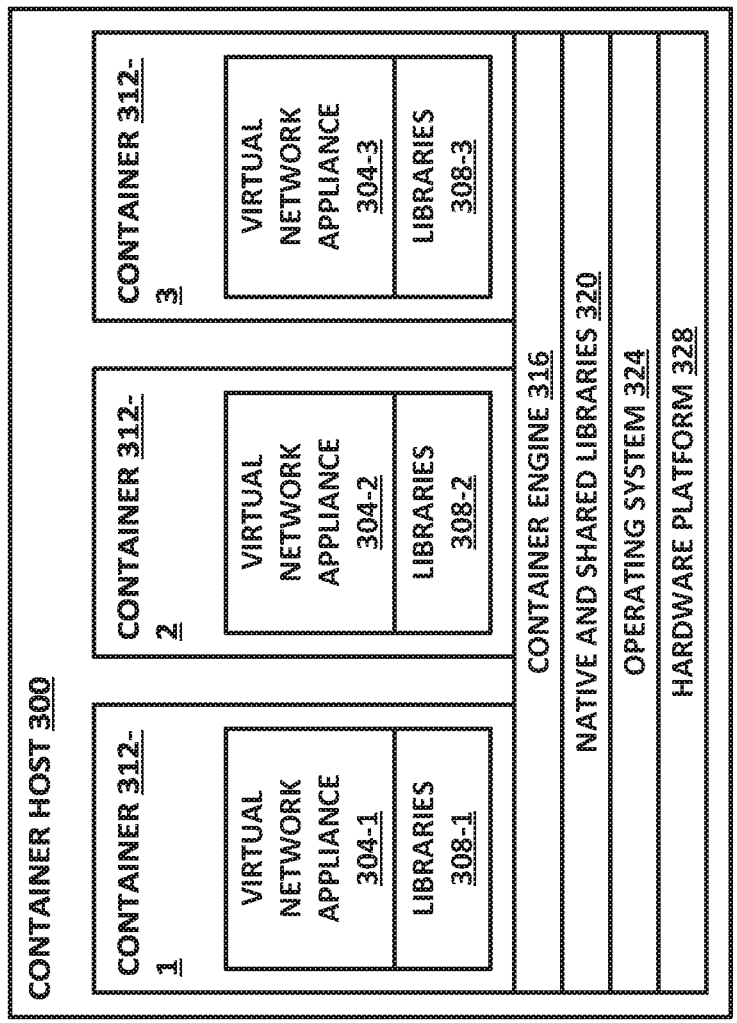
FIG. 3 is a block diagram of a container host, according to one or more examples of the present specification.

FIG. 3 is a block diagram of a container host 300, according to one or more examples of the present specification. With reference to FIG. 3, the teachings of this specification can be applicable to containerization or to NFV. Further, an intrusion protection system (IPS) or intrusion detection system (IDS) could be provided within a container as in FIG. 3. Incoming traffic may be redirected to the IDS. Container computing as provided by container host 300 is a response to some of the perceived limitations of network function virtualization. Specifically, some data centers are switching at least in part to containerized computing because of the relatively large overhead of a virtual machine versus the overhead of a container. Note that the present specification makes no attempt to judge the relative merits of container computing versus network function virtualization or the use of virtual machines, but rather illustrates both as computing architectures that may be deployed in a data center. The selection of the most appropriate architecture for a particular application is an exercise of skill that can be left to a system designer.

Container host 300 may be a server apparatus that may be found in a data center, such as a dedicated enterprise data center, or a large-scale data center such as provided by a CSP. Container host 300 may be thought of as a single computing device such as a rackmount server, blade server, or other device, with a hardware platform 328. Hardware platform 328 may include components such as a processor, memory, and appropriate interconnects such as a PCIe interconnect, an Intel Quick Path Interconnect (QPI), data buses, BIOS, support hardware, coprocessors, and any other hardware necessary to operate container host 300.

Container host 300 may also include an operating system 324 that runs on hardware platform 328. Operating system 324 may be, for example, a Linux operating system, a Windows operating system, or any other suitable operating system that provides containerized computing services.

Native and shared libraries 320 may be provided, which may include system-level libraries that can be shared between a number of different containers on container host 300. Note that the selection and operation of shared libraries is a nontrivial task, as one consideration in container computing is the ability of a container to maintain and manage its own set of libraries. However, native and shared libraries 320 may at least include libraries necessary to operate operating system 324, and to provide services to a container engine 316.

Container engine 316 may be one of several available container engines that are known, or that may be provided in the future as equivalents. For example, Microsoft Windows provides a container engine known as Docker. Some flavors of Linux provide a container engine known as Linux Containers (LXC), or an equivalent or associated engines. Other operating systems may provide other container engines 316 as appropriate to a particular deployment.

Container host 300 is designed to allow the deployment of a number of containerized appliances, such as virtual network appliances 304 on a single host without the overhead of a dedicated virtual machine (VM). A dedicated VM has its own operating system, a full set of libraries, and may have a specifically allocated number of cores and memory for that VM. One of the intended benefits of a container host 300 is to provide the isolation between virtual network appliances 304 as provided in VMs, without necessarily requiring the full overhead of a VM. On container host 300, a plurality of containers, such as container 312-1, container 312-2, and container 312-3 can be provided. Containers 312 are similar to VMs in that they provide "silos" wherein virtual appliances can be deployed and be isolated from one another. However, containers 312 all share the same underlying hardware platform 328, meaning that there is no need to allocate a specific number of cores or a specific size of memory to each container 312. Rather, container engine 316 and operating system 324 together can load balance resources according to the demands of the different containers 312.

Note, however, that this does not preclude the allocation of a certain number of cores or a certain size of memory to a particular container. Containers 312 also do not always need to replicate the underlying operating system 324 or native and shared libraries 320, thus saving overhead relative to a VM that replicates those pieces. In some cases, certain underlying libraries and services may be shared between containers 312, though the details of each deployment may vary. In some instances, each container contains a fully self-contained operating environment, including an operating system and all libraries.

Each container 312 may include a number of local container libraries 308, such as libraries 308-1 on container 312-1, libraries 308-2 on container 312-2, and libraries 308-3 on container 312-3. Libraries 308 are owned by their respective containers, and thus changes to the libraries in one container do not affect the libraries in another container. Libraries 308 is provided as a block to illustrate conceptually the use of different silos to isolate containers from one another, but this block is not limited specifically to shared object libraries, for example. Rather, libraries 308 should be understood broadly to encompass, as appropriate, an operating system, shared object libraries, static libraries, binaries, tools, tool chains, and software stacks that support virtual network appliance 304.

Virtual network appliance 304 provides, usually, a single dedicated network function, which may be part of a service chain, or which may provide a workload service, such as a web server, email server, or similar.

Because containers 312 are isolated from one another, changes within a container 312 do not affect other containers 312. Furthermore, errors, corruption, or problems encountered within a container 312 should not propagate to other containers 312. Thus, ideally, the use of container host 300 realizes the isolation benefits of virtualization without necessarily incurring the overhead.

Figure 4:
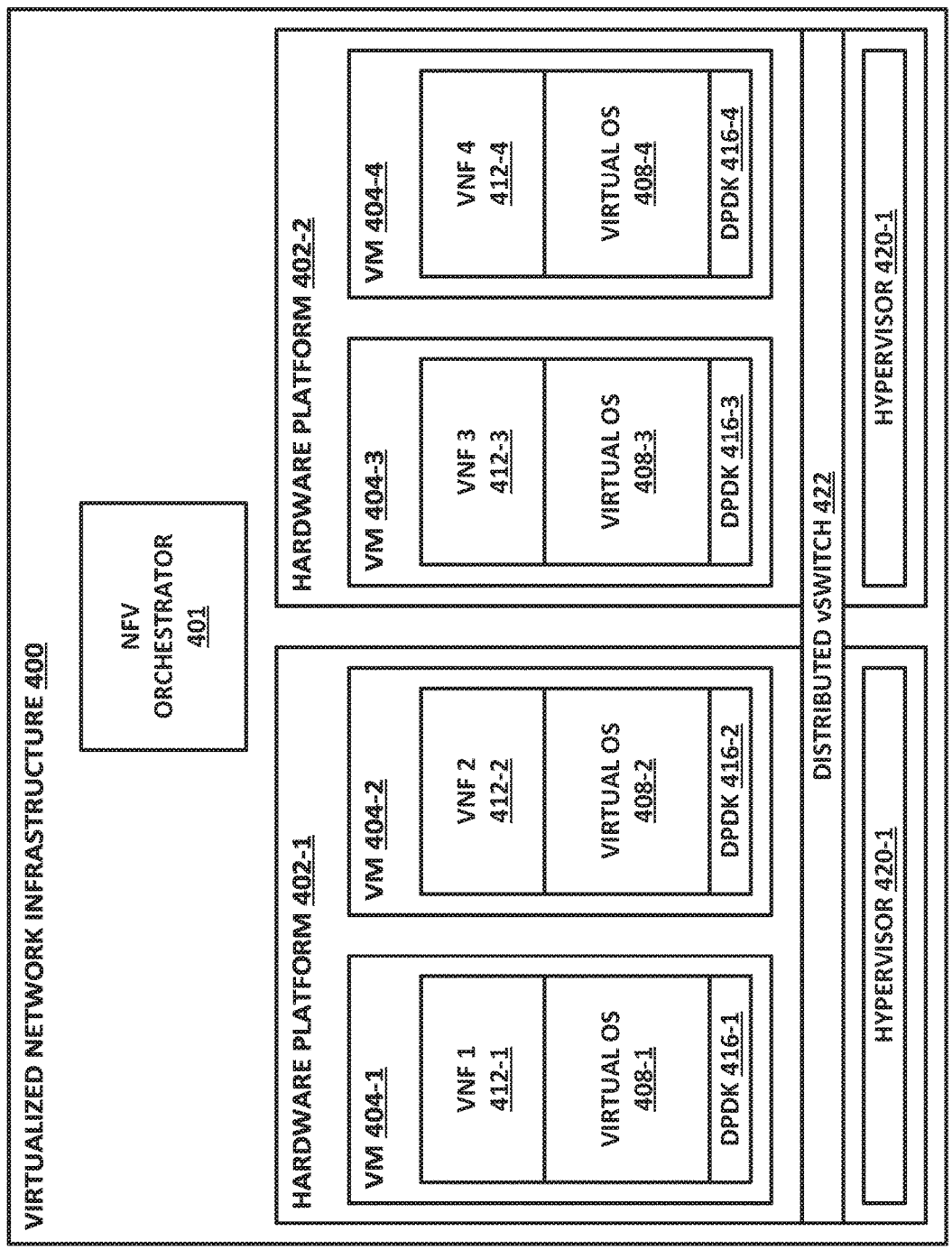
FIG. 4 is a block diagram of a network function virtualization (NFV) architecture according to one or more examples of the present specification.

FIG. 4 is a block diagram of a network function virtualization (NFV) infrastructure 400, according to one or more examples of the present specification. With reference to FIG. 4, the teachings of this specification can be applicable to containerization or to NFV. Further, a virtual machine (VM) could be provided within a container as in FIG. 4. Incoming traffic may be inspected according to a tag associated with the target container or VM. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. In other words, certain portions of the network may rely on SDN, while other portions (or the same portions) may rely on NFV.

In the example of FIG. 4, an NFV orchestrator 401 manages a number of the VNFs 412 running on an NFVI 400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 401 a valuable system resource. Note that NFV orchestrator 401 may provide a browser-based or graphical configuration interface, and in some embodiments may be integrated with SDN orchestration functions.

Note that NFV orchestrator 401 itself may be virtualized (rather than a special-purpose hardware appliance). NFV orchestrator 401 may be integrated within an existing SDN system, wherein an operations support system (OSS) manages the SDN. This may interact with cloud resource management systems (e.g., OpenStack) to provide NFV orchestration. An NFVI 400 may include the hardware, software, and other infrastructure to enable VNFs to run. This may include a hardware platform 402 on which one or more VMs 404 may run. For example, hardware platform 402-1 in this example runs VMs 404-1 and 404-2. Hardware platform 402-2 runs VMs 404-3 and 404-4. Each hardware platform may include a hypervisor 420, virtual machine manager (VMM), or similar function, which may include and run on a native (bare metal) operating system, which may be minimal so as to consume very few resources.

Hardware platforms 402 may be or comprise a rack or several racks of blade or slot servers (including, e.g., processors, memory, and storage), one or more data centers, other hardware resources distributed across one or more geographic locations, hardware switches, or network interfaces. An NFVI 400 may also include the software architecture that enables hypervisors to run and be managed by NFV orchestrator 401.

Running on NFVI 400 are a number of VMs 404, each of which in this example is a VNF providing a virtual service appliance. Each VM 404 in this example includes an instance of the Data Plane Development Kit (DVDK), a virtual operating system 408, and an application providing the VNF 412.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 4 shows that a number of VNFs 404 have been provisioned and exist within NFVI 400. This figure does not necessarily illustrate any relationship between the VNFs and the larger network, or the packet flows that NFVI 400 may employ.

The illustrated DPDK instances 416 provide a set of highly-optimized libraries for communicating across a virtual switch (vSwitch) 422. Like VMs 404, vSwitch 422 is provisioned and allocated by a hypervisor 420. The hypervisor uses a network interface to connect the hardware platform to the data center fabric (e.g., an HFI). This HFI may be shared by all VMs 404 running on a hardware platform 402. Thus, a vSwitch may be allocated to switch traffic between VMs 404. The vSwitch may be a pure software vSwitch (e.g., a shared memory vSwitch), which may be optimized so that data are not moved between memory locations, but rather, the data may stay in one place, and pointers may be passed between VMs 404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 422 is illustrated, wherein vSwitch 422 is shared between two or more physical hardware platforms 402.

Figure 5:
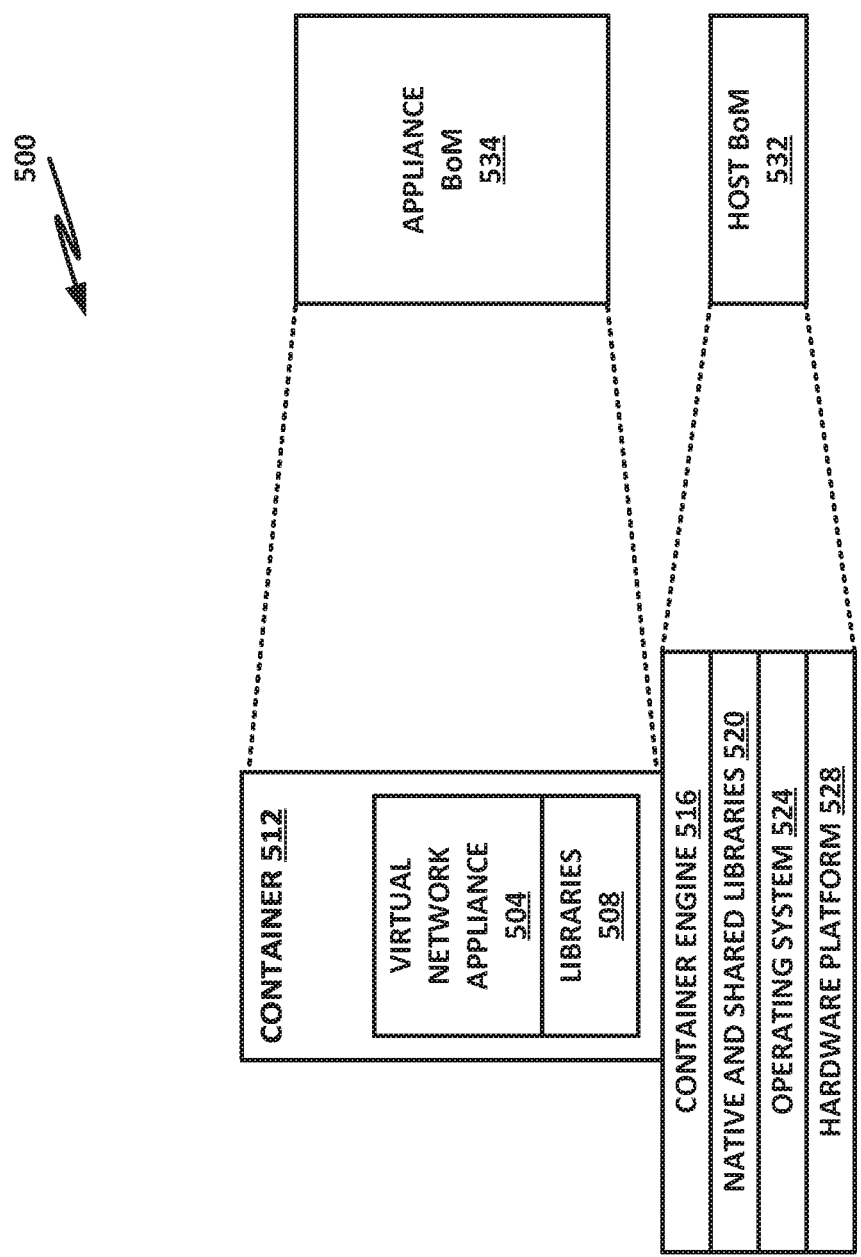
FIG. 5 is a block diagram of a containerized computing system, according to one or more examples of the present specification.

FIG. 5 is a block diagram of a containerized computing system 500, according to one or more examples of the present specification. Note that while FIG. 5 illustrates a containerized computing system, an NFV architecture could also be provided.

In this example, a container is provided including a hardware platform 528, an operating system 524, native and shared libraries 520, and container engine 516.

As necessary to the particular embodiment, the various components of the host platform itself may be itemized in a host bill of materials (BOM) 532. The host BOM may include hashes of the various components of the host, and as described above, may be matched according to a header field including the name and version number of the software component, and/or may be hashed according to a full binary hash of the component which may be used as an additional security mechanism to ensure that each component is what it claims to be. For example, the operating system may include a particular version of the Linux kernel, and that version of the Linux kernel may be hashed and compared against a binary identical Linux kernel to ensure that the kernel has not been compromised.

Container 512 includes a virtual network appliance 504 and a number of libraries and binaries 508. By way of nonlimiting example, binaries and libraries 508 may provide, among other things, the so-called LAMP stack (Linux, Apache, MySQL, PHP) which is used as a foundation for many web servers. Virtual network appliance 504 may provide on top of the LAMP stack, for example, an e-commerce website, such as OpenCart.

By way of illustrative example only, this specification will assume that container 512 is running an OpenCart virtual appliance on top of a LAMP stack. This should be understood as a nonlimiting example, and is provided to illustrate the operative principles of the present specification. It should be understood that any suitable libraries 508 and network appliance 504 may be used.

Using an OpenCart appliance on a LAMP stack as an example, a number of discrete elements may be defined:
  The Linux kernel and a Linux-based operating system.
  Apache web server.
  MySQL database server.
  PHP interpreter.
  OpenCart web front end.

Note that for purposes of illustration, the various components have been simplified in this description. Each of the elements listed above may include a number of dependencies and other binaries, and each of those may also be listed in an appropriate appliance BOM 534. Before the new binary appliances are executed within container 512, the binary may be scanned, and an appliance BOM 534 may be built.

While it is possible that containers could share components within the host BoM 532, for purposes of this illustration, we can assume that container 512 includes a Linux-based operating system and its associated dependencies as part of libraries 508. While it is also theoretically possible that the Apache web server could be provided as an underlying service within the container host, it is more common in a containerized system for the web server to be provided within the container itself. Thus, for purposes of this example, the Apache web server is provided in the appliance BOM 534. Similarly, while the MySQL database driver could hypothetically be provided within the container host, it is more common to include it within container 512 itself, and thus MySQL will also be listed in appliance BOM 534. Further as before, PHP could theoretically be provided on the container host, but is more likely to be provided within container 512, and thus PHP may be listed within appliance BOM 534. Finally, the OpenCart e-commerce front end is provided as virtual appliance 504, and will generally be listed within appliance BOM 534.

Figure 6:
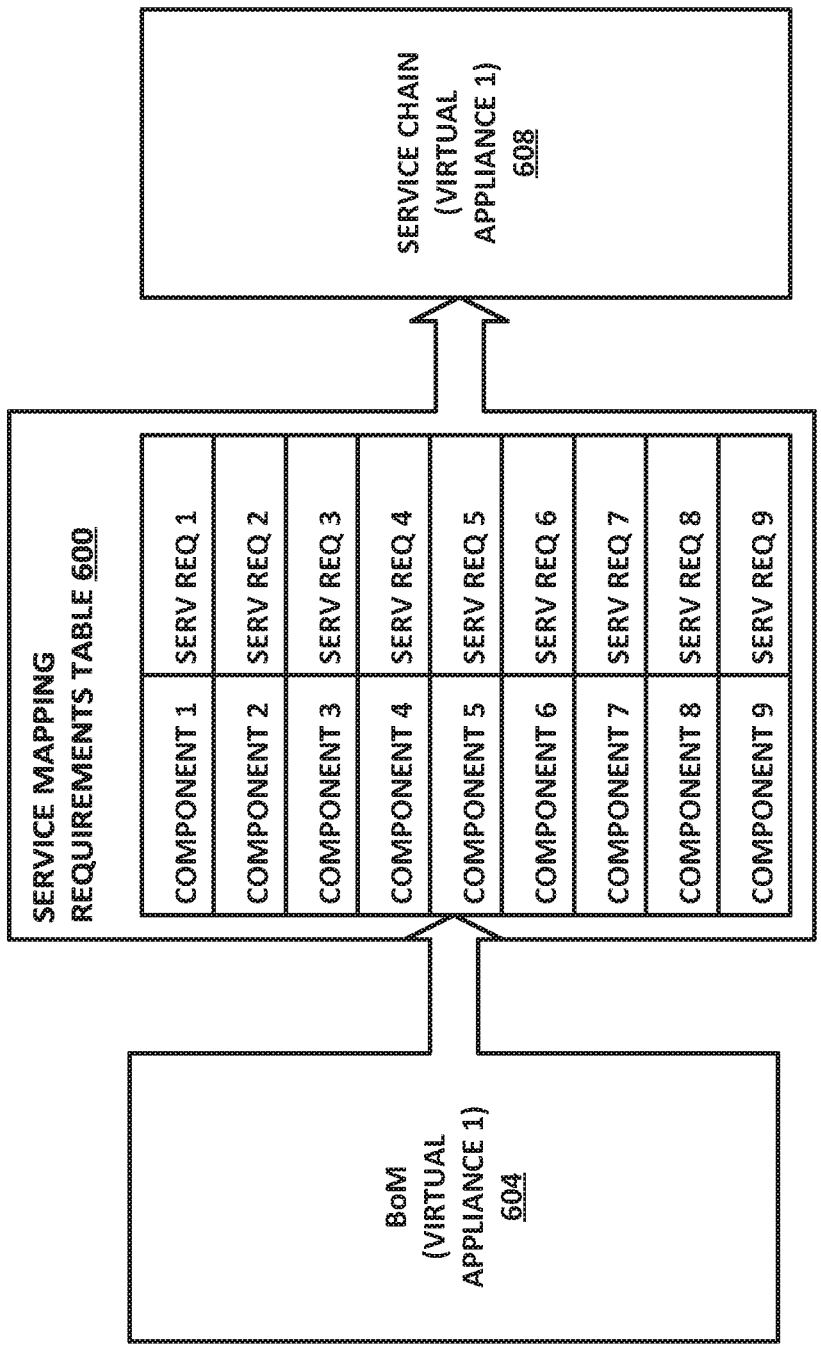
FIG. 6 is a block diagram illustrating the mapping of service requirements, such as an IPS or IDS policy, to various components that may be found in a bill of materials, according to one or more examples of the present specification.

FIG. 6 is a block diagram illustrating the mapping of service requirements, such as an IPS or IDS policy, to various components that may be found in a bill of materials, according to one or more examples of the present specification.

In this example, a bill of materials for a virtual appliance 1 604 is provided to a service mapping requirements table 600. Service mapping requirements table 600 includes a list of service requirements that are mapped to various known components with known security needs. For example, component 1 may be a Linux-based operating system. Service requirement 1 may be a list of service requirements that may be applied to a service chain for computers running that Linux operating system. This service chain may include, in particular, an IPS or IDS policy definition.

Component 2 may be the Apache web server, with service requirements 2 containing a list of security requirements for the Apache web server, including an IPS or IDS policy for the Apache web server.

Component 3 may be MySQL, with service requirements 3 containing server security service requirements for MySQL, including an IPS or IDS policy.

Component 4 may be PHP, with service requirements 4 including security service requirements for PHP, including an IPS or IDS policy.

Component 5 may be an OpenCart front end, with service requirements 5 including security service requirements for the OpenCart front end. There are also shown here components 6, 7, 8, and 9 with associated service requirements.

Based on the service requirements for each of the components listed in BOM 604, an appropriate device such as an orchestrator may craft a security policy for virtual appliance 1. This may include providing a service chain 608 for virtual appliance 1, which may be or may include an IPS or IDS node. Note that the IPS or IDS node may service a large number of virtual appliances, and thus IPS or IDS policies may be provided for each virtual appliance, with a tag associating that policy with the particular virtual appliance. Thus, when incoming traffic is redirected to the service chain, it is intercepted by the IPS or IDS node, and the node applies the appropriate intrusion policy to the packet according to the virtual appliance tag, and once the policy has been applied, the IPS or IDS node acts appropriately, such as taking a security action, or forwarding the packet to the destination service appliance once it has been appropriately screened.

Note that the components in service mapping requirements table 600 may be allocated at any appropriate level. For example, a component could include an individual library with a very specific version number, such as a specific version of the standard C library. In another example, an entire software stack may be characterized together as a "composite component," and a specific security policy may be applicable to that software stack, so long as the individual components in that stack are maintained with identical versions. For example, a full LAMP stack that uses a specific version of the Linux operating system kernel, a specific version of Apache, a specific version of MySQL, and a specific version of PHP and associated libraries may be characterized as a monolithic component if the use of that stack with each of those specific versions is common enough. Thus, an IPS or IDS policy may be defined for that entire software stack with those specific versions, and thus characterization of the software stack may be simplified by treating it as a single modular unit. This has the advantage of providing a single policy for the entire stack, but at the cost of flexibility. If any component in the software stack is changed, then the binary identity will be broken, and the security policy will no longer be applicable. Thus, it may be possible to define a default operation, wherein if the binary compatibility of the full software stack is broken, the individual components within that software stack may be characterized individually.

Figure 7:
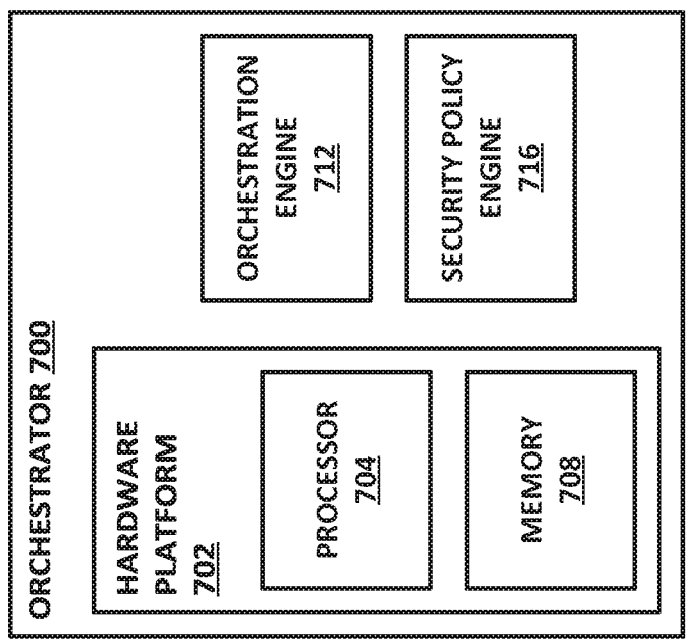
FIG. 7 is a block diagram of an orchestrator, according to one or more examples of the present specification.

FIG. 7 is a block diagram of an orchestrator 700, according to one or more examples of the present specification. In this example, orchestrator 700 may be similar to orchestrator 260 of FIG. 2, and may provide orchestration services to a data center such as an enterprise data center or a CSP data center. Note that the designation of orchestrator 700 is by way of example only, and any appropriate module or engine may be used to provide the services described herein.

In this example, orchestrator 700 includes a hardware platform 702, including a processor 704 and memory 708. Hardware platform 702 may also include other components such as memory buses, and communication buses such as peripheral component interconnect express (PCIe) or QuickPath Interconnect (QPI) buses. Orchestrator 700 also includes an orchestration engine 712, which may provide orchestration services to the data center. Finally, orchestrator 700 includes a security policy engine 716 which may include a service mapping requirements table 600 as in FIG. 6, and which may be configured to carry out methods according to this specification, including relevant portions of method 800 of FIG. 8.

Figure 8:
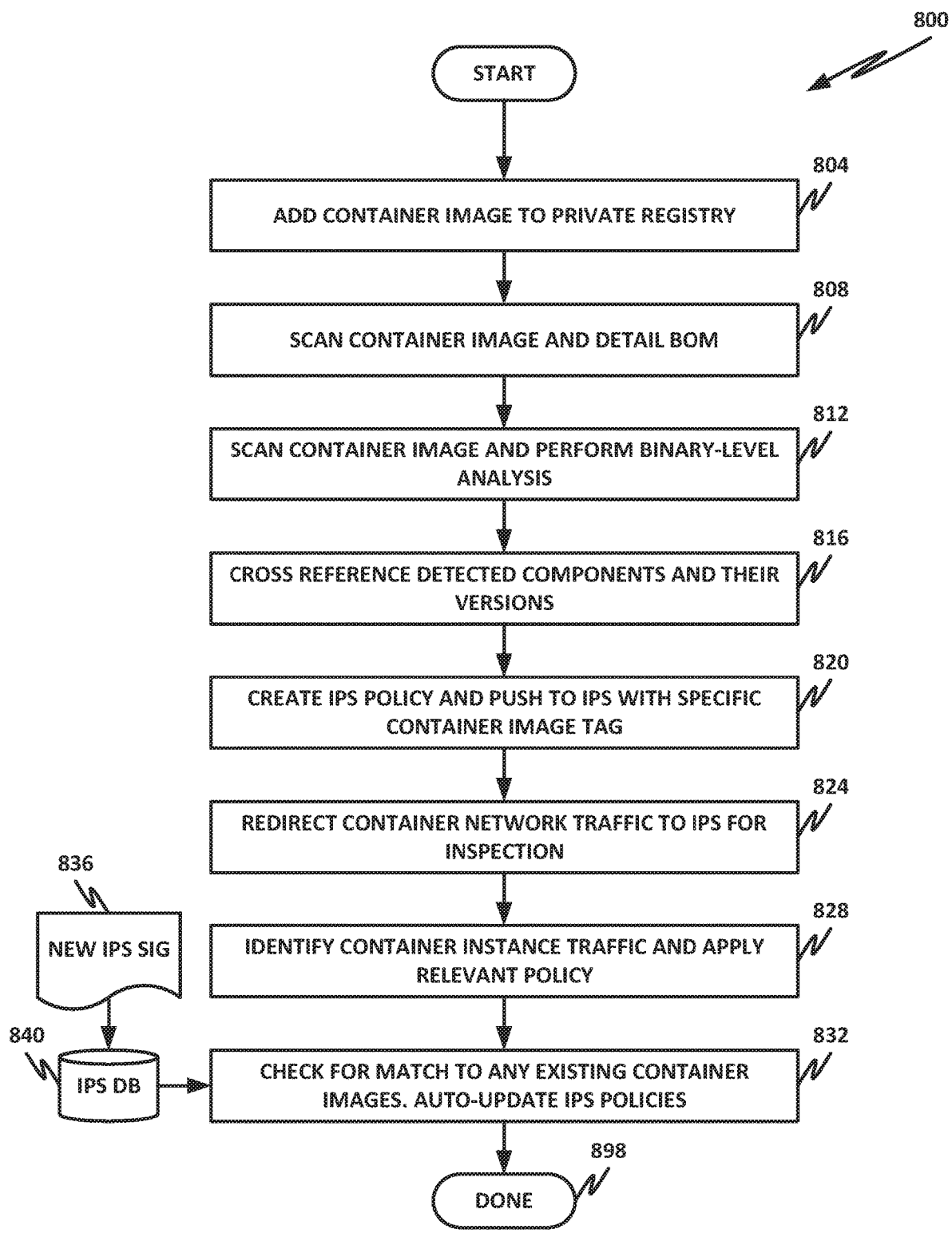
FIG. 8 is a flowchart of a method of providing security services, according to one or more examples of the present specification.

FIG. 8 is a flowchart of a method 800 of providing security services, according to one or more examples of the present specification.

In block 804, a new container image is received on a container host, and the container host adds the container image to its private registry.

In block 808, a security policy engine or other appropriate module scans the container image and creates a detailed bill of materials for that container image.

In block 812, the security policy engine performs binary level analysis on the individual components within the bill of materials. This may include, in one example, examining headers including a module name and version number and comparing it to known module names and version numbers with known security requirements, including known IPS or IDS requirements. In other examples, the full binary may be hashed and compared to known versions of the same binary which should be binary identical, and the hashes are compared to ensure that each component within the software stack is what it claims to be.

In block 816, the security policy engine cross-references detected components and their versions with known security policies such as in a service mapping requirements table.

In block 820, the security policy engine may create security policies, including an IPS policy for the new container with a specific container image tag. This can be pushed out to an IPS or IDS appliance within a service chain.

In block 824, as traffic comes into the system, the system redirects traffic to the service chain, which may include the IPS or IDS appliance.

In block 828, the IPS or IDS appliance identifies the container instance tagged for this traffic, and applies the relevant policy.

In block 832, the security policy engine 716 may also check the IPS database 840 for any new IPS signatures 836 that have been added to the database. If any matches are found for existing container images, then the new policies may be auto-updated and pushed out to the IPS or IDS appliance so that when new traffic comes in, the new policy is applied to that traffic.

In block 898, the method is done.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other nonvolatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or H™ L for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform; a service mapping requirements table comprising a plurality of components and having associated therewith a plurality of service requirements; an isolation platform; and a security policy engine configured to: receive a new appliance image for the isolation platform; scan the new appliance image and build a bill of materials (BoM) for the new container image, the BoM comprising a plurality of components; search the service mapping requirements table for the plurality of components and identify service requirements for the components; and generate a security policy for the new appliance image.

Example 2 includes the computing apparatus of example 1, wherein the virtualization platform is a hypervisor or virtual machine manager.

Example 3 includes the computing apparatus of example 1, wherein the isolation platform is a container platform, and wherein the appliance image is a container image.

Example 4 includes the computing apparatus of example 1, wherein the security policy engine is further to receive an update for the service mappings requirements table, and to update the security policy according to the update.

Example 5 includes the computing apparatus of example 1, wherein scanning the new appliance image comprises a binary scan.

Example 6 includes the computing apparatus of example 1, wherein scanning the new appliance image comprises scanning headers of one or more components.

Example 7 includes the computing apparatus of example 1, wherein scanning the new appliance image comprises hashing components and comparing the hash to a hash of a known good version.

Example 8 includes the computing apparatus of example 1, wherein the plurality of components comprises a composite component including a plurality of discrete components.

Example 9 includes the computing apparatus of any of examples 1-8, wherein the security policy is an intrusion prevention system (IPS) or intrusion detection system (IDS) policy.

Example 10 includes the computing apparatus of example 9, wherein the security policy engine is further to push the security policy to an IPS or IDS.

Example 11 includes one or more tangible, non-transitory computer-readable storage mediums having stored thereon executable instructions to instruct a hardware computer platform to: provision a service mapping requirements table comprising a plurality of components and having associated therewith a plurality of service requirements; provide an isolation platform; and receive a new appliance image for the isolation platform; scan the new appliance image and build a bill of materials (BoM) for the new container image, the BoM comprising a plurality of components; search the service mapping requirements table for the plurality of components and identify service requirements for the components; and generate a security policy for the new appliance image.

Example 12 includes the one or more tangible, non-transitory computer-readable mediums of example 11, wherein the virtualization platform is a hypervisor or virtual machine manager.

Example 13 includes the one or more tangible, non-transitory computer-readable mediums of example 11, wherein the isolation platform is a container platform, and wherein the appliance image is a container image.

Example 14 includes the one or more tangible, non-transitory computer-readable mediums of example 11, wherein the security policy engine is further to receive an update for the service mappings requirements table, and to update the security policy according to the update.

Example 15 includes the one or more tangible, non-transitory computer-readable mediums of example 11, wherein scanning the new appliance image comprises a binary scan.

Example 16 includes the one or more tangible, non-transitory computer-readable mediums of example 11, wherein scanning the new appliance image comprises scanning headers of one or more components.

Example 17 includes the one or more tangible, non-transitory computer-readable mediums of example 11, wherein scanning the new appliance image comprises hashing components and comparing the hash to a hash of a known good version.

Example 18 includes the one or more tangible, non-transitory computer-readable mediums of example 11, wherein the plurality of components comprises a composite component including a plurality of discrete components.

Example 19 includes the one or more tangible, non-transitory computer-readable mediums of any of examples 11-18, wherein the security policy is an intrusion prevention system (IPS) or intrusion detection system (IDS) policy.

Example 20 includes the one or more tangible, non-transitory computer-readable mediums of example 19, wherein the security policy engine is further to push the security policy to an IPS or IDS.

Example 21 includes a computer-implemented method of providing an automated security policy, comprising: provisioning a service mapping requirements table comprising a plurality of components and having associated therewith a plurality of service requirements; providing an isolation platform; and receiving a new appliance image for the isolation platform; scanning the new appliance image and build a bill of materials (BoM) for the new container image, the BoM comprising a plurality of components; searching the service mapping requirements table for the plurality of components and identify service requirements for the components; and generating a security policy for the new appliance image.

Example 22 includes the method of example 21, wherein the virtualization platform is a hypervisor or virtual machine manager.

Example 23 includes the method of example 21, wherein the isolation platform is a container platform, and wherein the appliance image is a container image.

Example 24 includes the method of example 21, wherein the security policy engine is further to receive an update for the service mappings requirements table, and to update the security policy according to the update.

Example 25 includes the method of example 21, wherein scanning the new appliance image comprises a binary scan.

Example 26 includes the method of example 21, wherein scanning the new appliance image comprises scanning headers of one or more components.

Example 27 includes the method of example 21, wherein scanning the new appliance image comprises hashing components and comparing the hash to a hash of a known good version.

Example 28 includes the method of example 21, wherein the plurality of components comprises a composite component including a plurality of discrete components.

Example 29 includes the method of any of examples 21-28, wherein the security policy is an intrusion prevention system (IPS) or intrusion detection system (IDS) policy.

Example 30 includes the method of example 29, wherein the security policy engine is further to push the security policy to an IPS or IDS.

Example 31 includes an apparatus comprising means for performing the method of any of examples 21-30.

Example 32 includes the apparatus of example 31, wherein the means for performing the method comprise a processor and a memory.

Example 33 includes the apparatus of Example 32, wherein the memory comprises machine-readable instructions, that when executed cause the apparatus to perform the method of any of examples 21-30.

Example 34 includes the apparatus of any of Examples 21-23, wherein the apparatus is a computing system.

Example 35 includes at least one computer readable medium comprising instructions that, when executed, implement a method or realize an apparatus as illustrated in any of examples 21-34.

What is claimed is:

1. A computing apparatus, comprising:
   a hardware platform;
   a service mapping requirements table comprising a plurality of components and having associated therewith a plurality of service requirements;
   an isolation platform; and
   a security policy engine configured to:
      receive a new appliance image for the isolation platform;
      scan the new appliance image, comprising hashing components and comparing the hash to a hash of a known good version, and build a bill of materials (BoM) for the new appliance image, the BoM comprising a list of layers and software components of the appliance image;
      search the service mapping requirements table for the layers and software components, and identify security service requirements for the layers and software components; and
      generate a security policy for the new appliance image according to the security service requirements.

2. The computing apparatus of claim 1, wherein the isolation platform is a hypervisor or virtual machine manager.

3. The computing apparatus of claim 1, wherein the isolation platform is a container platform, and wherein the appliance image is a container image.

4. The computing apparatus of claim 1, wherein the security policy engine is further to receive an update for the service mapping requirements table, and to update the security policy according to the update.

5. The computing apparatus of claim 1, wherein scanning the new appliance image comprises a binary scan.

6. The computing apparatus of claim 1, wherein scanning the new appliance image further comprises scanning headers of one or more components.

7. The computing apparatus of claim 1, wherein the plurality of components comprises a composite component including a plurality of discrete components.

8. The computing apparatus of claim 1, wherein the security policy is an intrusion prevention system (IPS) or intrusion detection system (IDS) policy.

9. The computing apparatus of claim 8, wherein the security policy engine is further to push the security policy to an IPS or IDS.

10. One or more tangible, non-transitory computer-readable storage mediums having stored thereon executable instructions to instruct a hardware computer platform to:

provision a service mapping requirements table comprising a plurality of software components and having associated therewith a plurality of service requirements for the software components;
provide an isolation platform;
receive a new appliance image for the isolation platform;
scan the new appliance image, comprising hashing components and comparing the hash to a hash of a known good version, and build a listing of software components for the new appliance image;
search the service mapping requirements table for the plurality of software components and identify associated service requirements for the components; and
generate a security policy for the new appliance image from the associated security requirements.

11. The one or more tangible, non-transitory computer-readable mediums of claim 10, wherein the isolation platform is a hypervisor or virtual machine manager.

12. The one or more tangible, non-transitory computer-readable mediums of claim 10, wherein the isolation platform is a container platform, and wherein the appliance image is a container image.

13. The one or more tangible, non-transitory computer-readable mediums of claim 10, wherein the security policy engine is further to receive an update for the service mapping requirements table, and to update the security policy according to the update.

14. The one or more tangible, non-transitory computer-readable mediums of claim 10, wherein scanning the new appliance image comprises a binary scan.

15. The one or more tangible, non-transitory computer-readable mediums of claim 10, wherein scanning the new appliance image further comprises scanning headers of one or more components.

16. The one or more tangible, non-transitory computer-readable mediums of claim 10, wherein the plurality of components comprises a composite component including a plurality of discrete components.

17. The one or more tangible, non-transitory computer-readable mediums of claim 10, wherein the security policy is an intrusion prevention system (IPS) or intrusion detection system (IDS) policy.

18. The one or more tangible, non-transitory computer-readable mediums of claim 17, wherein the security policy engine is further to push the security policy to an IPS or IDS.

19. A computer-implemented method of providing an automated security policy, comprising:
provisioning a service mapping requirements table associating one or more security requirements with each of a plurality of software layers and/or components;
providing an isolation platform;
receiving a new appliance image for the isolation platform;
scanning the new appliance image to identify software layers and/or components of the new appliance image, comprising hashing components and comparing the hash to a hash of a known good version;
searching the service mapping requirements table for the software layers and/or components of the new appliance image and for associated security requirements; and
generating a security policy for the new appliance image, including policy derived from the associated security requirements.

20. The method of claim 19, wherein the isolation platform is a hypervisor or virtual machine manager.

21. The method of claim 19, wherein the isolation platform is a container platform, and wherein the appliance image is a container image.

22. The method of claim 19, wherein the security policy engine is further to receive an update for the service mapping requirements table, and to update the security policy according to the update.

23. The method of claim 19, wherein scanning the new appliance image comprises a binary scan.

24. The method of claim 19, wherein scanning the new appliance image further comprises scanning headers of one or more components.

25. The method of claim 19, wherein the plurality of components comprises a composite component including a plurality of discrete components.

* * * * *